US012361925B2

United States Patent
Bratt et al.

(10) Patent No.: US 12,361,925 B2
(45) Date of Patent: Jul. 15, 2025

(54) CONTROLLABLE, NATURAL PARALINGUISTICS FOR TEXT TO SPEECH SYNTHESIS

(71) Applicant: SRI International, Menlo Park, CA (US)

(72) Inventors: Harry Bratt, Mountain View, CA (US); Colleen Richey, Foster City, CA (US); Maneesh Yadav, San Francisco, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 17/776,145

(22) PCT Filed: Dec. 29, 2020

(86) PCT No.: PCT/US2020/067381
§ 371 (c)(1),
(2) Date: May 11, 2022

(87) PCT Pub. No.: WO2021/262238
PCT Pub. Date: Dec. 30, 2021

(65) Prior Publication Data
US 2022/0406292 A1 Dec. 22, 2022

Related U.S. Application Data

(60) Provisional application No. 63/042,085, filed on Jun. 22, 2020.

(51) Int. Cl.
*G10L 13/10* (2013.01)
*G06F 40/117* (2020.01)
(Continued)

(52) U.S. Cl.
CPC ............ *G10L 13/10* (2013.01); *G06F 40/117* (2020.01); *G06F 40/169* (2020.01); *G06F 40/40* (2020.01); *G10L 13/033* (2013.01); *G10L 13/047* (2013.01)

(58) Field of Classification Search
None
See application file for complete search history.

(56) References Cited

U.S. PATENT DOCUMENTS

| 5,555,343 A | * | 9/1996 | Luther | ...................... G06F 3/16 704/260 |
| 10,319,365 B1 | * | 6/2019 | Nicolis | ................... G10L 15/26 |

(Continued)

FOREIGN PATENT DOCUMENTS

JP 2020034883 A 2/2023

OTHER PUBLICATIONS

International Search Report and Written Opinion, PCT/US2020/067381, ISA:US, Dec. 29, 2020, 16 pages.
(Continued)

*Primary Examiner* — Nicole A K Schmieder
(74) *Attorney, Agent, or Firm* — Rutan and Tucker, LLP

(57) ABSTRACT

A speech recognition module receives training data of speech and creates a representation for individual words, non-words, phonemes, and any combination. A set of speech processing detectors analyze the training data of speech from humans communicating. The set of speech processing detectors detect speech parameters that are indicative of paralinguistic effects on top of enunciated words, phonemes, and non-words in the audio stream. One or more machine learning models undergo supervised machine learning on their neural network to train on how to associate one or more mark-up markers with a textual representation, for each individual word, individual non-word, individual phoneme,
(Continued)

and any combinations of these, that was enunciated with a particular paralinguistic effect. Each mark-up marker can correspond to its own paralinguistic effect.

20 Claims, 4 Drawing Sheets

(51) Int. Cl.
  *G06F 40/169* (2020.01)
  *G06F 40/40* (2020.01)
  *G10L 13/033* (2013.01)
  *G10L 13/047* (2013.01)

(56) References Cited

U.S. PATENT DOCUMENTS

| | | | |
|---|---|---|---|
| 11,380,300 B2* | 7/2022 | Joseph | G10L 13/0335 |
| 2007/0055527 A1* | 3/2007 | Jeong | G10L 13/033 |
| | | | 704/260 |
| 2010/0082326 A1* | 4/2010 | Bangalore | G10L 13/10 |
| | | | 704/3 |
| 2019/0332680 A1 | 10/2019 | Wang et al. | |

OTHER PUBLICATIONS

Japanese Patent Office, Notice of Reasons for Rejection, dated Oct. 8, 2024, 9 pages.
International Searching Authority, The International Search Report and the Written Opinion of the International Searching Authority, or the Declaration, dated Apr. 29, 2021, 16pp.

* cited by examiner

CONTROLLABLE, NATURAL PARALINGUISTICS FOR TEXT TO SPEECH SYNTHESIS

CROSS-REFERENCE

This application is a 35 U.S.C. § 371 U.S. National Stage of International Patent Application No. PCT/US2020/067381, titled "CONTROLLABLE, NATURAL PARALINGUISTICS FOR TEXT TO SPEECH SYNTHESIS" having an International Filing Date of Dec. 29, 2020 which claims priority under 35 U.S.C. 119 to U.S. provisional patent application Ser. No. 63/042,085, titled "Controllable, natural paralinguistics for text to speech synthesis," filed Jun. 22, 2020, the disclosure of which is incorporated herein by reference in its entirety.

FIELD

An embodiment of the design generally relates to a voice generated by a computing device. An embodiment of the design also generally relates to a computing device understanding a user's speech input.

BACKGROUND

The same or similar words in a spoken sentence can convey different meanings depending upon the types of acoustic cues used on those words within that a spoken sentence. For example, "My loving husband" spoken with upbeat acoustic cues can convey a sentiment of endearment. "My loving husband" spoken slowly with lengthening the enunciation of the words 'loving' and 'husband' and in a growling voice can convey a sentiment of 'dislike.' In another example, "Yeah" spoken with a normal enunciation can convey a meaning of 'yes, correct.' In contrast, "Yeah, yeah, yeah" spoken with a lengthening of the enunciation of each subsequent 'yeah' compared to an earlier 'yeah' and a fall in intonation of the phrase as it progresses through the 'yeahs' conveys a sentiment of irony and a meaning of 'not very likely.' People use a variety of acoustic cues (which are overlaid as an additional source of information on top of the words themselves) to convey or clarify meaning. Like, most "normal" words, extremely common non-words like "huh" and "mm" can have multiple meanings such as i) skepticism, ii) lack of understanding, iii) impatience, iv) etc., and are often clarified by humans speaking the non-word with acoustic cues indicating paralinguistic effects. A typical teenager might express that everyone knows you cannot use paralinguistic effects via prosody changes to convey secondary information, such as being ironic or sarcastic, when speaking with voice digital assistant, like Alexa, or a non-native speaker of that language because you must be very literal with your words as well as slow and deliberate with your speech to successfully communicate with them. Currently, it seems having limited literal computer speak exchanges with a computer system is not seen as a problem but rather an expected norm.

Thus, many prior computer dialogue systems did not make particular use of lower level speech phenomenon, such as emphasis of a word within a sentence for a particular discourse meaning, a change in a duration and/or pitch of an enunciated word to convey additional information beyond the word itself, etc. Many prior computer dialogue systems just analyze literally the enunciated words and/or non-words and ignore any paralinguistic effect conveyed along with the enunciated words and/or non-words. Likewise, many prior dialogue systems would merely speak in a monotone manner enunciating the word or non-word to a user without any paralinguistic effects. Also, some dialogue systems may often generate prosody in arbitrary ways unconnected to the meaning or the state of the discourse, which can be confusing and/or make some utterances difficult to comprehend.

Paralinguistic effects can often be very nuanced and complex. Different patterns of similar lower level speech phenomenon as well as where positionally within a word or sentence the paralinguistic effect occurs can all potentially change the secondary meaning conveyed with using a particular paralinguistic effect.

Several types of Artificial Intelligence disciplines exist such as robotic artificial intelligence, natural language processing artificial intelligence, machine learning including deep learning artificial intelligence, fuzzy logic artificial intelligence, etc. At least three types of machine learning exist i) supervised learning including semi-supervised learning, ii) unsupervised learning, and iii) reinforcement learning. In addition, there are many machine learning algorithms within that machine learning algorithm category, such as: 1—Clustering Algorithms (e.g. Hierarchical Clustering, k-Means, etc.); 2—Association Rule Learning Algorithms (e.g. Apriori algorithm, Eclat algorithm, etc.); 3—Neural Network Algorithms (e.g. Perceptron algorithm, Multilayer Perceptrons (MLP) algorithm, Back-Propagation algorithm, Stochastic Gradient Descent algorithm, Hopfield Network algorithm, Radial Basis Function Network (RBFN) algorithm, Deep Learning Neural Network Algorithms—Convolutional Neural Network (CNN), Recurrent Neural Networks (RNNs), Long Short-Term Memory Networks (LSTMs), Stacked Auto-Encoders, Deep Boltzmann Machine (DBM), Deep Belief Networks (DBN), etc. -); 4—Dimensionality Reduction Algorithms (e.g. Principal Component Analysis (PCA), Linear Discriminant Analysis (LDA), etc.); 5—Regularization Algorithms (e.g. Least Absolute Shrinkage and Selection Operator (LASSO), Elastic Net, etc.); 6—Decision Tree Algorithms (e.g. Decision Stump, M5, Conditional Decision Trees etc.); 7—Bayesian Algorithms (e.g. Naive Bayes, Gaussian Naive Bayes, Bayesian Network (BN), etc.); 8—Regression Algorithms (e.g. Linear Regression, Logistic Regression, etc.); 9—Instance-based Algorithms (e.g. k-Nearest Neighbor (kNN), Self-Organizing Map (SOM), Support Vector Machines (SVM), etc.); 10—Ensemble Algorithms (e.g. Boosting, Stacked Generalization, Random Forest, etc.); and more yet to be listed.

SUMMARY

In an embodiment, one or more machine learning models are trained to examine audio data that includes at least one of i) a word, ii) a phoneme, iii) a non-word, in a speech communication. The i) word, ii) phoneme, and/or iii) non-word is annotated with the one or more mark-up markers that guide a generation of a textual representation to cause a different enunciation from a plain enunciation that would occur without the mark-up markers in order to convey at least one of 1) an additional intended meaning of and 2) an increased comprehension of the enunciated i) phoneme, ii) word, and/or iii) non-word themselves. The one or more machine learning models were trained with training data of humans speaking with paralinguistic effects. A speech generation module can receive the textual representation generated to guide the speech generation module so that the speech generation module is configured to create speech in the different enunciation with the particular paralinguistic effect in a manner that better conveys 1) the additional intended meaning of and/or 2) the increased comprehension of the enunciated i) phoneme, ii) word, and/or iii) non-word themselves.

In an embodiment, a training system can contain at least a set of speech processing detectors, a speech recognition module, and one or more machine learning models. The speech recognition module receives the training data of the audio stream of speech and creates 1) a textual representation, 2) a time-aligned phonetic representation, and 3) any combination of both, for individual words, individual non-words, individual phonemes, and any combinations of these, in the training data of the audio stream of speech. The set of speech processing detectors analyze the training data of the audio stream of speech from humans communicating. The set of speech processing detectors detect speech parameters that are indicative of one or more paralinguistic effects on top of enunciated words, phonemes, and non-words in the audio stream. The one or more machine learning models undergo supervised machine learning on their neural network to train on how to associate one or more mark-up markers with 1) the textual representation, 2) the waveform representation, and 3) any combination of both, for each i) individual word, ii) individual non-word, iii) individual phoneme, and iv) any combinations of these, that was enunciated with a particular paralinguistic effect. Each mark-up marker corresponds to its own paralinguistic effect.

Figure 1:
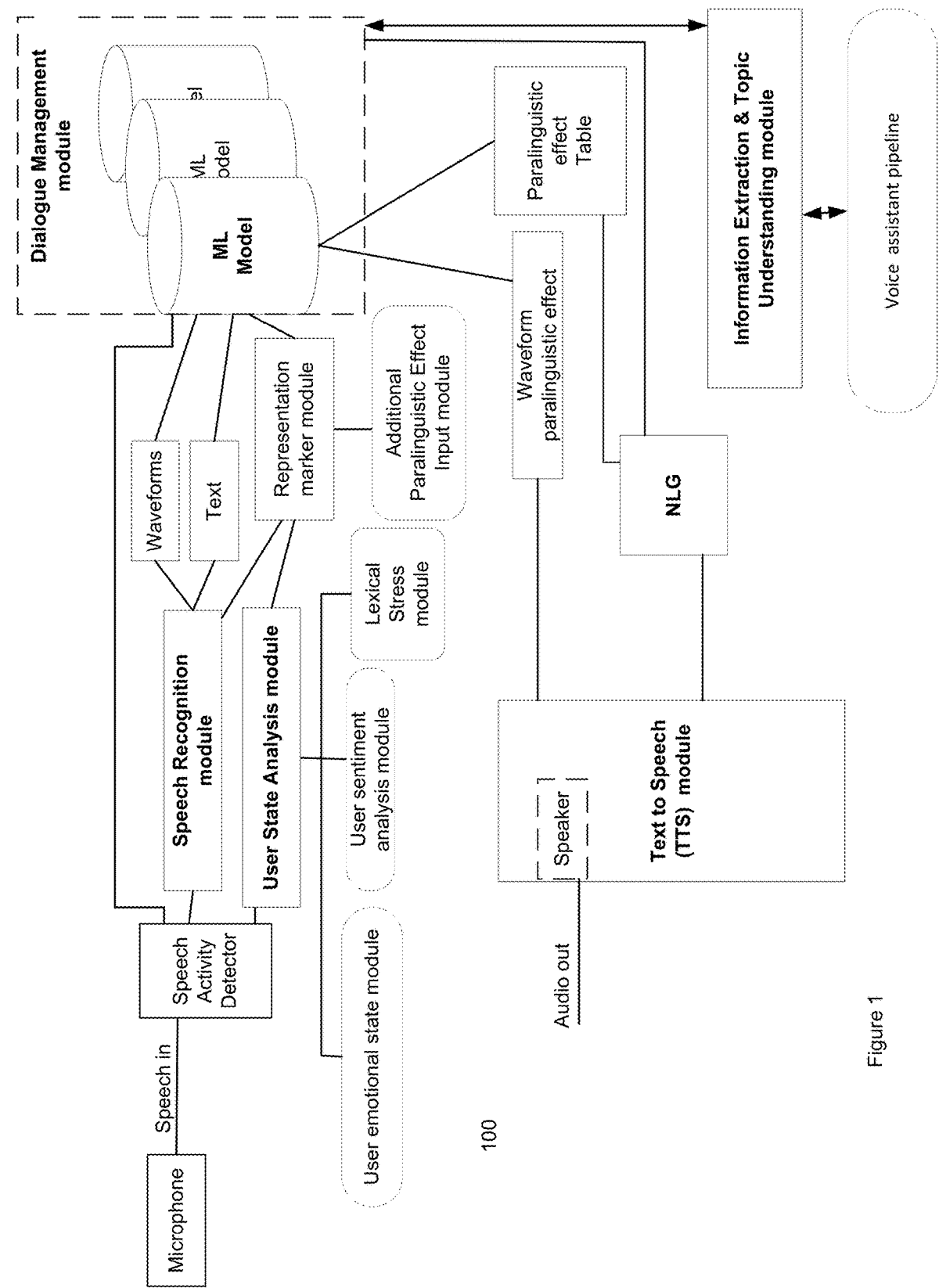
FIG. 1 illustrates a block diagram of an embodiment of an example conversational engagement platform containing a dialogue management module cooperating with one or more machine learning models that receive parameters tied to a user's speech input from the other modules, where the machine learning models are trained to understand a user's conveyed meaning, including potential paralinguistic effects, as well as to cause changes in prosody to convey paralinguistic effects when speaking to the user.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DETAILED DESCRIPTION

This disclosure describes inventive concepts with reference to specific examples. However, the intent is to cover modifications, equivalents, and alternatives of the inventive concepts that are consistent with this disclosure. It will be apparent, however, to one of ordinary skill in the art that the present approach can be practiced without these specific details. Thus, the specific details set forth are merely exemplary, and are not intended to limit what is presently disclosed. The features implemented in one embodiment may be implemented in another embodiment where logically possible. Further, specific numeric references such as the first user, can be made. However, the specific numeric reference should not be interpreted as a literal sequential order but rather interpreted that the first user is different than a second user. The features implemented in one embodiment may be implemented in another embodiment where logically possible. The specific details can be varied from and still be contemplated to be within the spirit and scope of what is being disclosed.

FIG. 1 illustrates a block diagram of an embodiment of an example conversational engagement platform containing a dialogue management module cooperating with one or more machine learning models that receive parameters tied to a user's speech input from the other modules, where the machine learning models are trained to understand a user's conveyed meaning, including potential paralinguistic effects, as well as to cause changes in prosody to convey paralinguistic effects when speaking to the user. The conversational engagement platform 100 can use a speech generation module, such as a text-to-speech module, to produce speech in audio files or video files with acoustic cues through prosody to cause two or more paralinguistic effects that each would change an enunciation of i) a phoneme, ii) a word, iii) a non-word, and iv) any combination of these, in a different enunciation from a normal enunciation of that i) phoneme, ii) word, and/or iii) non-word, as an additional source of information on top of the enunciated i) phoneme, ii) word, and/or iii) non-word. The speech generation module receives 1) a textual representation, 2) a sound wave representation, or 3) a combination of both, annotated with one or more mark-up markers (e.g. diacritic symbols, etc.) on the i) phoneme, ii) word, and/or iii) non-word. These received representations of speech guide the speech generation module on how to enunciate the i) phoneme, ii) word, and/or iii) non-word with a particular paralinguistic effect, via a change in the prosody to cause the different enunciation from the normal enunciation of that i) phoneme, ii) word, and/or iii) non-word for a given communication in order to convey the particular paralinguistic effect. The particular paralinguistic effect is communicated in a manner according to actual learned examples from humans communicating the particular paralinguistic effect to provide that additional source of information when enunciating the i) phoneme, ii) word, and/or iii) non-word. One or more machine learning models are trained to examine the i) word, ii) phoneme, and/or iii) non-word annotated with the one or more mark-up markers and then guide a generation of 1) the textual representation, 2) the sound wave representation, or 3) the combination of both, received by the speech generation module on how to enunciate the i) phoneme, ii) word, or iii) non-word with the particular paralinguistic effect, via the change in the prosody to cause the different enunciation from the normal enunciation in the manner humans communicate the additional information, on top of the enunciated i) phoneme, ii) word, and/or iii) non-word themselves. The machine learning models can assist in the annotating of a correct mark-up marker onto a representation of the i) phoneme, ii) word, and/or iii) non-word and/or supply a speech wave file directly to the speech generation module. The speech generation module is configured to enunciate the i) phoneme, ii) word, and/or iii)

non-word with the particular paralinguistic effect, via the change in the prosody through a speaker.

Note, a phoneme can be a perceptually distinct unit of sound in a specified language within a word and/or non-word. Around 40+ phonemes are used in, for example, the English language. An example of a phoneme is "c" in the word "car," since it has its own unique sound. English can contain phonemes of 19 vowel sounds (5 short vowels, 6 long vowels, 3 diphthongs, 2 'oo' sounds, and 3 r-controlled vowel sounds) and 25 consonant sounds. Also, any software portions of the various modules and machine learning models discussed herein are stored in one or more non-transitory storage mediums in an executable format by one or more processors.

In an embodiment, the speech generation module can receive the textual representation generated to guide the speech generation module so that the speech generation module is configured to create speech in the different enunciation with the particular paralinguistic effect in a manner that better conveys 1) the additional intended meaning of and/or 2) the increased comprehension of the enunciated i) phoneme, ii) word, and/or iii) non-word themselves.

The conversational engagement platform 100, such as a dialogue system, can contain the various modules of a speech activity detector, a speech recognition module, a dialogue management module cooperating with one or more machine learning models trained on paralinguistic effects conveyed with human speech as well as a set of mark-up markers that correlate to each particular paralinguistic effect, a user-state analysis module with input from a suite of speech analysis detectors, e.g. a User emotional state module, a User sentiment analysis module, a Lexical Stress module, etc., a representation marker module, a timing module, a natural language generator module, a speech generation module, an information extraction & topic understanding module, a voice assistant pipeline, and other modules. In the conversational engagement platform 100, the system can dynamically adapt this conversational engagement platform 100 between casual conversation and directed dialogue based on the conversational context.

The dialogue capability in the conversational engagement platform 100 is enhanced via the trained one or more machine learning models to support almost human-like dialogue that i) leverages multi-modal inputs, such as sentiment, lexical stress, and emotion, ii) builds details on the user and activities details in order to leverage them in subsequent dialogues, iii) etc.

In an embodiment, one or more machine learning models trained to examine audio data that includes at least one of i) a word, ii) a phoneme, iii) a non-word, in a speech communication, that is annotated with the one or more mark-up markers and guide a generation of a textual representation to cause a different enunciation from a plain enunciation that would occur without the mark-up markers in order to convey at least one of 1) an additional intended meaning of and 2) an increased comprehension of the enunciated i) phoneme, ii) word, and/or iii) non-word themselves, where the one or more machine learning models were trained with training data of humans speaking with paralinguistic effects.

Again, a variety of acoustic cues (in addition to and often overlaid on top of the words themselves) can be added to human speech to convey or clarify meaning. Prosody can be the changes in individual speech parameters of, (e.g. volume, pitch, duration/length), tone, rhythm, and intonation (e.g. the rise and fall of the voice in speaking) as well as different patterns of these in a spoken language. These acoustic cues through changes in prosody on words, non-words, and even phonemes serve many purposes; for example, they serve discourse functions that control and manage an interaction. For example, a speaker can use a pattern in prosody of a rising pitch followed by a pitch plateau on most words to convey that the speaker wishes to hold the conversation floor. Likewise, a speaker can use a prosody of lengthening the 'm' sound in "Hmmm . . . ?" to indicate uncertainty or questioning an authenticity of what a user just said. Humans often convey an acoustic cue as an additional source of information on top of the actual word, non-word, and/or phoneme uttered. In addition, verbal emphasis in words, non-words, phonemes, and emphasis position within other words and non-words being conveyed can change their meaning or clarify the importance of their meaning depending on where the acoustic stress is placed. Thus, 'changes in' and 'patterns of' prosody can reflect various features of an utterance: the emotional state of the speaker; the form of the utterance (statement, questioning/inquiry, or command); the sentiment (e.g. presence of irony or sarcasm); a contrast; an emphasis of points within a communication, etc. These acoustic changes in prosody convey these additional points of information beyond the definition meaning of the words or non-words themselves. Thus, the acoustic cues through prosody changes in prosody is an additional source of information and often overlaid on top of the actual word, non-word, and/or phoneme uttered/enunciated. However, many prior dialogue systems simply ignored the prosody component being conveyed and merely attempted to understand or utter merely the words and/or non-words themselves.

Thus, many current text-to-speech synthesis are not readily able to utilize and control these paralinguistic cues to either convey this additional information on top of the enunciated word, non-word, phoneme itself; or likewise, understand this additional information when a user speaks with paralinguistic effects, which puts significant constraints on the naturalness and understandability of, for example, a dialogue system. The design introduces mechanisms to better understand, utilize, and convey paralinguistic effects that convey additional information when the words and/or non-words are uttered.

The representation marker module can cooperate with the one or more machine learning models trained on paralinguistic effects and a set of mark-up markers that correlate to each particular paralinguistic effect. The representation marker module can cooperate with the one or more machine learning models to annotate mark-up markers onto representations of speech correlating to paralinguistic effects for discourse functions (such as "hold the floor" or "elicit feedback from the other party"). When a mark-up marker is annotated onto the representations of speech, such as text or waveforms of words, phonemes, and non-words, then the acoustic signal cues synthesized by the speech generation module can provide controllable, natural paralinguistics for a text to speech synthesis.

The mark-up markers annotated onto a representation of speech are input to the speech generation module which allows a system developer to specify and control aspects of the output that relate to paralinguistic features such as stress, emphasis, discourse function, etc. These paralinguistic effects may be realized at a lower, acoustic level by the system manipulating speech parameters such as length, loudness, pitch height, pitch contour, phonation type, vocal effort, etc.

Humans can convey an intended paralinguistic effect by changing these 1) speech parameters compared to the norm (e.g. differing from the norm by e.g. 35%) and 2) patterns of how these speech parameters are changed.

Example System Processing

A conversational engagement platform 100 may converse back and forth with one or more humans utilizing paralinguistic effects. A human user's speech can be communicated through a microphone. Thus, a human conversation utilizing 1) i) phonemes, ii) words, iii) non-words, and iv) any combination of these, enunciated with paralinguistic effects and as well as 2) normal/standard enunciations of the i) phonemes, ii) words, iii) non-words, and iv) any combination of these, are communicated to a speech activity detector. The microphone digitizes the vibrations caused by the sound by taking measurements of the wave frequency. The system can then filter the digitized sound to remove unwanted noise outside of the spoken voice frequency range. The microphone converts the vibrations and frequencies of a user's voice into digitized data (such as a sound wave file). The microphone's output supplies the digitized speech into a speech activity detector.

The speech activity detector detects when speech is occurring and sends those digitized speech files as well as time codes to i) an automatic speech recognition module, ii) a user-state analysis module, iii) a time syncing module, and iv) the dialogue manager module. Note, the one or more machine learning models may standalone as their own distinct component or be incorporated into a larger module such as a dialog manager module or the speech generation module.

The time codes will help the time syncing module to synchronize the output data from these different processes on each i) phoneme, ii) a word, iii) a non-word, and iv) any combination of these, in the voice stream after being processed from each module back to its relative position within the voice stream.

In parallel to the other processes receiving the speech activity detectors output, the automatic speech recognition module can produce 1) waveforms of individual words, phonemes, and non-words, 2) textual representations of the individual words, phonemes, and non-words, as well as 3) any combination of both. The automatic speech recognition module can take in the input of the digitized speech data activity from the speech detector and create individual sound waveforms for the words, non-words, phonemes, and any combinations of these. Likewise for text produced, the automatic speech recognition module can take in the input of the digitized speech data and create individual textual representations of the individual words, individual non-words, individual phonemes, and/or combinations of these.

Note, one form of a textual representation that a developer may use is ordinary orthography. Note, orthography can be the system of writing conventions used to represent spoken English in written form that allows readers to connect spelling to sound to meaning. Another form of textual representation may be a phonemic or sub-phonemic (phonological feature-based) representation, with length, loudness, etc. specified implicitly or explicitly for each phoneme (phonological segment). Another form of textual representation may be a phonetic sounding of the of the i) phoneme, ii) word, or iii) non-word.

In parallel to the other processes, the user-state analysis module analyzes the speech data through a number of different speech processing detectors for the user's state of emotion, sentiment, lexical points being stressed, and other states that where conveyed within the input speech data. The user-state analysis module analyzes each individual word, non-word, and phoneme for these as well as for individual low-level speech parameters. The user state analysis module works with a number of different automated speech analyzing detectors The set of speech processing detectors can include a user's emotional state module, such as SRI International's SenSay speech platform and SRI International's J-miner platform, a user's sentiment analysis module, a lexical stress module, etc. These detectors and their algorithms detect a range of speech parameters/phenomenon and the acoustic realizations of the speech phenomenon. The speech processing detectors detect speech parameters that are relevant building blocks that can be combined or filtered, using linguistic knowledge, to yield approximations to the desired paralinguistic effects. The user-state analysis module can identify individual words, non-words, and phonemes that were not standardly enunciated; and thus, most likely had a paralinguistic effect conveying additional information on top of the spoken/enunciated word, non-word, and/or phoneme itself. For each word, non-word, and phoneme conveyed with a paralinguistic effect, the user-state analysis module can output the detected user states, such as emotion, sentiment, lexical stress, and other paralinguistic effects on individual words, non-words, and phonemes that were identified by the detectors as being enunciated non-standardly as well as if the detector happened to determine other types of paralinguistic intent. The output of individual words, non-words, and phonemes that were identified by the detectors as being enunciated non-standardly as well as what the paralinguistic effect was, is sent to the representation marker module. The supervised learning can use a linguistic expert to confirm the identified paralinguistic effect suggested by the detection tools in the user-state analysis module. Additionally, through an additional paralinguistic effect input module, the linguistic expert can put in additional paralinguistic effects that the expert providing the supervised machine learning detected on individual phonemes, words, and non-words, such as a change in prosody to communicate the user's intent to continue to hold the conversation floor, and/or other paralinguistic effects that are detected by the user and can be flagged by the expert. In a feedback loop, the linguistic expert providing the supervised machine learning can provide the confirmation of the machine learning models prediction of a paralinguistic effect detected and its conveyed additional information/meaning conveyed when used. Note, the capabilities of detecting individual low-level speech parameters of the set of speech analyzing detectors can be used as a component in identifying when paralinguistic effects are being coupled with an enunciated word, non-word, and/or phoneme.

The set of detectors analyzing speech data from humans communicating one or more paralinguistic effects can further include the following. 1) a pitch detector configured to use a fundamental frequency to find i) a highest pitch on a phoneme in a word and a sentence ii) a trend of pitch rising or falling throughout the sentence, and iii) combinations of both. 2) a lexical emphasis detector configured to compare a duration of length saying a phoneme vs a normal of the length of uttering that phoneme (where the norm can factor in an identified dialect) as well as a loudness of a word relative to other words conveyed at a same time. 3) a stress detector configured to examine a combination of pitch, volume, and duration. 4) a sentiment detector configured to detect a user's sentiment.

The detectors can use lower level speech analysis tools to extract speech characteristic, e.g.:

i) Model lengthening by running forced-alignment, extracting which determines phonemes are long (e.g. 90th percentile or greater) or short (e.g. 10th percentile or less) for their class, and annotate these with an example mark-up marker of a colon "(:)" (mark-up marker indicating a lengthened version of this phoneme);

ii) detect sentential stress using a lexical stress tool and create an example mark-up marker to corresponds to a lexical stress.

iii) detect phrase-final prosody using pitch trajectory from f0 tracker. Note, a fundamental frequency, F0, can generally be associated with the lowest frequency in a harmonic series (equal to the difference between neighboring harmonics).

The representation marker module can annotate each phoneme, word, and/or non-word, and its detected paralinguistic effects with a corresponding mark-up marker. The mark-up marker can be a high-level discourse-relevant markup. The representation marker module can reference a table of mark-up markers to corresponding paralinguistic effect and its prosody patterns and changes that correlate to a particular paralinguistic effect. In this way, the paralinguistic effects can be annotated in an audio corpus in an automated fashion.

The set of detectors cooperating with the representation marker and machine learning models provides a mechanism for the machine learning models to learn to distinguish the paralinguistic meanings of non-lexical units that are generally written identically (e.g. "uh-huh" indicating agreement, vs. skepticism, vs. impatience, vs. expressing speaker's belief as to whether the other party is done) and to use them in dialogue-appropriate places.

Again, the timing module can help sync up the individual waveform representations, textual representations of the words, non-words, and phonemes from the speech recognition module and the identified words, non-words, and phonemes with potential paralinguistic effects from the speech detectors so that these representations of speech can be annotated in a rapid efficient manner. Additionally, these inputs help the machine learning models using a neural network to piece together the many different forms of input into predicted paralinguistic effect, intended additional information, and prosody changes and patterns that correlate to the predicted paralinguistic effect.

The outputs from 1) of the digitized data of the audio stream with its time codes from the speech activity detector, 2) sound waveform representations of individual i) a phoneme, ii) a word, iii) a non-word, and iv) any combination of these, annotated with mark-up markers, and/or 3) textual representations of individual i) a phoneme, ii) a word, iii) a non-word, and iv) any combination of these, annotated with mark-up markers, 4) the timing module timeline can be supplied to the one or more machine learning models that have trained been trained on paralinguistic effects. Additionally, a bilateral feedback loop exists between the representation marker module and the one or more machine learning models to identify paralinguistic effects, the prosodic patterns and changes associated with various paralinguistic effects, and a corresponding mark-up marker. The machine learning-based TTS system has trained on and learned the sophisticated acoustic patterns associated with these paralinguistic effects, which allows them to be exploited by a dialogue system using a speech generation module.

Figure 2:
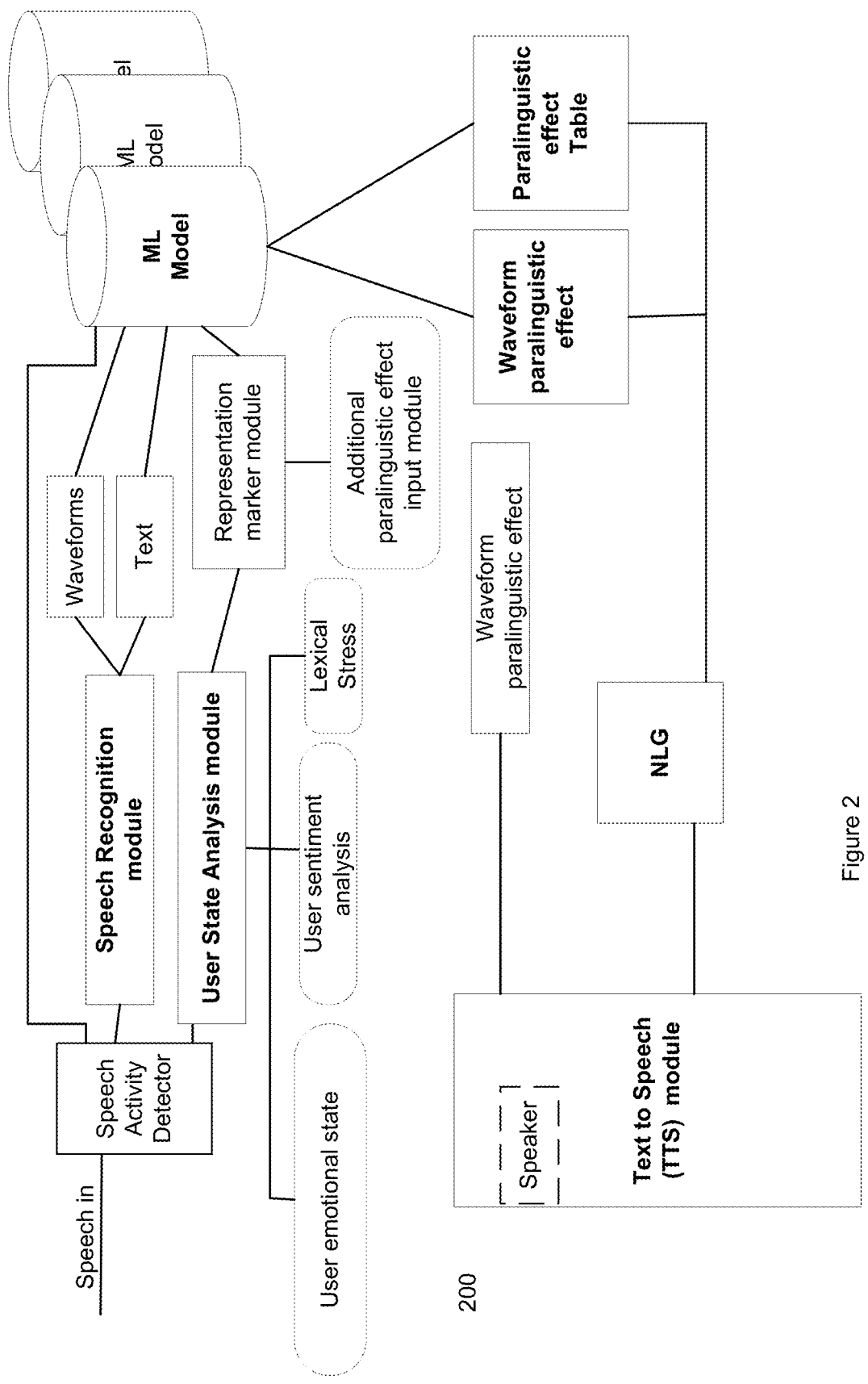
FIG. 2 illustrates a block diagram of an example training system for one or more machine learning models trained on paralinguistic effects conveyed with human speech as well as a set of mark-up markers that correlate to each particular paralinguistic effect.

Note, FIG. 2 goes over a training system 200 to automate the pre-deployment training of the one machine learning models trained on paralinguistic effects conveyed with human speech as well as a set of mark-up markers that correlate to each particular paralinguistic effect in more detail.

In sum, the machine learning models can learn both the prosodic patterns that humans use with each other when communicating a particular paralinguistic effect as well as the mark-up marker corresponding to that particular paralinguistic effect. A mapping process leverages an ability the set of speech detectors to automatically detect many low-level and high-level aspects of speech, which are mapped to each corresponding paralinguistic effect, mapped to a corresponding mark-up marker. The mapping process with the feedback loop takes advantage of the machine learning model's capability with, for example, neural networks (e.g. deep neural networks (DNNs)) to implicitly model and learn patterns. The machine learning models can also learn the additional information typically conveyed by a paralinguistic effect on top of the enunciated word, phoneme, and/or non-word itself. The mapping process can then also map to a corresponding intended additional information conveyed with the corresponding paralinguistic effect.

In an embodiment, a table can map a set of mark-up markers. Each different mark-up marker can be mapped to its corresponding particular paralinguistic effect on the enunciated i) phoneme, ii) word, and/or iii) non-word. The machine learning models cooperate with the table to produce the changes in the enunciation of the i) phoneme, ii) word, and/or iii) non-word when conveying a particular paralinguistic effect. The machine learning models are trained with supervised machine learning on how to identify the paralinguistic effects and corresponding mark-up markers, as well as then to understand the additional information being conveyed with each particular paralinguistic effect.

The machine learning models can assist in both 1) producing paralinguistic effects in the text-to-speech output as well as 2) more accurately identify what the additional information is that is being conveyed when a human communicates a particular paralinguistic effect beyond just the spoken word and/or nonwords themselves. The machine learning models are trained on changes in prosody including prosodic patterns as well as changes of individual speech parameters including volume, duration, pitch, and intonation of a rise and fall of these speech parameters to associate and understand the changes of prosody on i) individual phonemes, ii) individual words, and iii) individual non-words to particular paralinguistic effects detected by the set of speech processing detectors in the training data of the audio stream of speech. The machine learning model(s) analyzing and training on paralinguistic effects with its corresponding mark-up marker, can learn many functions. The machine learning model(s) can learn how to identify the paralinguistic effects and corresponding mark-up marker as well then understand the additional information conveyed by a human speaking with paralinguistic effects.

Likewise on the speech generated by the dialogue system, the machine learning model(s) can learn to identify the paralinguistic effects and corresponding mark-up marker that the system would want to annotate onto a textual or waveform representation of a word, phoneme, or non-word to convey additional information when the text to speech engine enunciates speech with paralinguistic effects.

A table can be configured to map a set of mark-up markers (e.g. simple diacritic symbols), each different mark-up marker is mapped to its own corresponding particular paralinguistic effect on the enunciated i) phoneme, ii) word, and/or iii) non-word, which has a simple meaning within the discourse (like a pronunciation of an example phoneme in a word or non-word that indicates an intention to "cede' the conversation floor") and that may correspond to complex, nonlocal acoustic correlations. Each paralinguistic effect corresponds to its own change in prosody of 1) individual speech parameters relative to other communications conveyed along with the enunciated i) phoneme, ii) word, and/or iii) non-word as well as 2) prosodic patterns conveyed along with the enunciated i) phoneme, ii) word, and/or iii) non-word. The table can initially be created by a linguistics expert mapping out paralinguistic effects to corresponding patterns of prosodic changes and/or individual changes in prosody. However, the table can be updated and revised by the machine learning model as it learns the prosodic pattern changes and other paralinguistic nuances, guided by the supervised machine learning confirming or correcting the results from the machine learning model's update.

A natural language generator module can be configured to generate a representation of i) the phoneme, ii) the word, and/or iii) the non-word. The table can be referenced by a natural language generator module to mark up the textual representation, waveform representation, or any of these representations, with the one or more mark-up markers [diacritic symbols, etc.] of the i) phoneme, ii) word, or iii) non-word, to guide the speech generation module on how to enunciate the i) phoneme, ii) word, or iii) non-word with the paralinguistic effect, via a change in the prosody to cause the different enunciation from the standard/normal enunciation of that i) phoneme, ii) word, or iii) non-word. For example, a mark-up marker corresponding to a paralinguistic effect of lexical stress can make the word with the mark-up marker the most prominent word emphasized in a sentence relative to other words conveyed at essentially the same time.

In an embodiment, the natural language generator module can generate the textual representation of i) the phoneme, ii) the word, and/or iii) the non-word. The table of mark-up markers can be set so each mark-up marker corresponds its own paralinguistic effect. The table can be referenced by the natural language generator module to mark-up the textual representation of the i) phoneme, ii) word, or iii) non-word, with the one or more mark-up markers to guide the speech generation module on how to enunciate the i) phoneme, ii) word, or iii) non-word with the paralinguistic effect to cause the different enunciation from the plain enunciation of that i) phoneme, ii) word, or iii) non-word. The different enunciation can differ in one or more speech parameters from the plain enunciation of that i) phoneme, ii) word, or iii) non-word by a threshold amount.

The dialogue manager with the machine learning model(s) already trained on the examples from humans communicating a set of particular paralinguistic effects and their corresponding mark-up makers provides guidance to a natural language generator how to mark-up a representation of the i) phoneme, ii) word, or iii) non-word with mark-up markers indicating a paralinguistic effect associated with a given annotated phoneme, where a given mark-up marker instructs the speech generation module how to enunciate that phoneme with a particular paralinguistic effect. The machine learning models are trained to learn how to identify each different paralinguistic effect and its corresponding markup marker as well as then how to produce waveform alterations when conveying the first paralinguistic effect and the second paralinguistic effect. This gives a speech generation module better control over prosody in a spoken sentence or back channel uttered by the speech generation module in, for example, a Virtual Digital Assistant, like Alexa or Siri.

Thus, the dialogue manager with the machine learning model(s) already trained on the examples from humans communicating a set of particular paralinguistic effects and their corresponding mark-up makers can also provide guidance to the natural language generator on how to express and emphasize particular words, non-words, and/or phonemes that are intended to be conveyed relative to both a norm of how that particular word, non-word, and/or phoneme is enunciated and relative to other words, non-words, and/or phonemes in a set of words, non-words, and/or phonemes that are being conveyed while the speech generation module holds the conversational floor (which these other non-marked up words, non-words, and/or phonemes in the set will be enunciated normally without alterations of volume, pitch, or duration). Next, the natural language generator module generates textual representation with the one or more annotated mark-up markings on one or more particular words, non-words, and/or phonemes that are intended to be conveyed while the speech generation module holds the conversational floor, and implements this by referencing a table mapping a given mark-up marker to a corresponding paralinguistic effect, and then annotates each of the textual representations (e.g. word-like symbols) of the word, phoneme or non-words being stressed with the appropriate diacritic symbol to cause the corresponding paralinguistic effects, which is supplied as input to TTS module. Optionally, the speech generation module, such as the text-to-speech module, can reference the machine learning model on how to produce the sound waves being enunciated through the speaker by the text-to-speech to convey the set of text containing one or more words, non-word, or phonemes that are enunciated with paralinguistic effects. The trained model examines each word, phoneme, or non-words being enunciated different than its norm with the appropriate diacritic symbol to cause the corresponding paralinguistic effects.

The machine learning models and the natural language generator can also cooperate with a set of waveforms in reference channels as opposed to a table. The set of two or more channels with waveforms of phonemes can be used as a reference for both the natural enunciation and the enunciation with each different paralinguistic effect. Thus, the two or more channels with waveforms of, for example, phonemes, can be referenced by the natural language generator module in order to mark-up the waveforms of phonemes and compare differences between the two input channels with mark-up markers corresponding to paralinguistic effects being the differences.

Paralinguistic effects can often be very nuanced and complex with different patterns of similar lower level speech phenomenon and positioning within a word or sentence can change the meaning of the conveyed paralinguistic effect. The machine learning helps learn the nuances so that these nuances can be recognized and distinguished from each other. The cooperation between the natural language generator, speech generation module, and machine learning model(s) provide a way to specify simple, conversation-relevant information with paralinguistic effects beyond the phonemes to have a speech generation module that i) is easier to understand and ii) can be used in a more nuanced dialogue system.

For example, some paralinguistic effects include a speaker 1) stressing and/or emphasizing a particular word of importance in a sentence by changing its enunciation volume or duration, 2) a rising pitch followed by a pitch plateau to communicate the additional information on top of the enunciated words that speaker still wishes to hold the floor, 3) lengthen the 'm' sound in "mmm . . . " to plateau in pitch, and these communicate the additional information on top of the enunciated words that speaker is communicating.

Some additional paralinguistic effects include a speaker 4) conveying uncertainty about something, by raising a pitch of an ending phoneme to communicate the additional information on top of the enunciated words that a speaker is questioning a meaning, 5) raising a volume and shortening a duration of a given word to communicate the additional information on top of the enunciated words that a speaker is angered, 6) lowering a volume and lengthening a duration to communicate the additional information on top of the enunciated words that speaker is saddened, 7) and many other prosodic patterns and/or changes of an individual prosodic parameter.

With the benefit of a machine learning model, the text to speech synthesis provides a more human-like naturalness in its ability to produce and control paralinguistic cues. Again, paralinguistic effects can be a component of meta-communication that may modify, for example, a meaning to give a nuanced meaning, conveying, for example, surprise, anger, questioning, slowing speech to increase an understanding, creating longer pauses for long lists (of instructions, complicated information, or convey emotion"), etc. An important function of a paralinguistic effect is to convey information—i) more clearly than without the paralinguistic phenomenon, and/or 2) more efficiently than with additional words alone.

The combination of these should result in a better, more paralinguistically appropriate and informative text-to-speech output from the speech generation module as well as a conversational engagement platform that can process a fuller range of speech input from its users.

The machine learning model cooperating with the natural language generator identifies mark-up markers for the intended paralinguistic functions to be inserted into an intended string of words and non-words by a system using the speech generation module, based on a determination from the one or more AI models that have learned where humans tend to use the paralinguistic cues.

As discussed, the natural language generator marks up a waveform representation, a text representation, and any of these, annotated with a mark-up marker that corresponds to a particular paralinguistic effect desired to be communicated along with the word, phoneme, and/or non-word in the waveform representation or text representation and supplies this to the speech generation module.

When the dialogue system wants to generate speech with paralinguistic effects, then the one or more machine learning models are configured to examine the word, phoneme, and/or non-word annotated with the one or more mark-up markers and supplies a sound wave file of the i) phoneme, ii) word, or iii) non-word with the paralinguistic effect corresponding to the one or more mark-up markers, to the speech generation module to properly enunciate the i) phoneme, ii) word, or iii) non-word with the paralinguistic effect in a manner humans communicate the additional information on top of the enunciated i) phoneme, ii) word, or iii) non-word themselves through changes in the prosody] through a speaker.

Thus, the speech generation module takes a marked-up, for example, orthographic representation as its input, and enunciates a i) phoneme, ii) a word, iii) a non-word, and iv) any combination of these with the paralinguistic effect indicated by the mark-up maker annotated on that i) phoneme, ii) word, and/or iii) non-word. Note, how the markup and its prosody change and or prosodic pattern is realized will depend on the spoken language, such as English, and can have subsequent distinction on the dialect within a language, such as a New York accent. One or more models can cooperate to provide this functionality to multiple spoken languages and/or different dialects within one spoken language.

Likewise, the speech generation module can reference one or more the machine learning models on how to pronounce each given phoneme annotated with its mark-up markings for different domains, such as for domain of elderly person being talked to, or medical person being talked to, etc.

The machine learning model cooperation with the text-to-speech and natural language generator module are able to produce many kinds of prosodic characteristics that are used all the time in human-human interaction to manage a discourse, manage turn-taking, control the speed of information flow, confirm understanding or indicate lack of understanding, and so on.

With the paralinguistic ability provided by the waveforms and the table provided by the machine learning, the text-to-speech is able to provide control to system developers for prosodic variations that serve a variety of discourse functions and that humans commonly use. The paralinguistic layer added into the text-to-speech allows a naturalness and potentially greater clarity of a text-to-speech system's output, for example in the context of a dialogue system, and allows system developers to use more verbose strategies to communicate information. A user of a spoken language system may be uncertain when the system is done speaking and/or what the system's state of processing or of knowledge is, by use of monotone words alone, or worse, by arbitrary use of prosody that doesn't correspond with the meaning. Yet, when the same words are conveyed explicitly to users via acoustic cues through targeted, meaningful prosodic changes and/or patterns (e.g. by without spelling out the status in words and visually showing the spelled words to a recipient), then this increases user understanding over merely words alone.

The potential payoffs are that the text-to-speech output may sound much more human and natural than today's text-to-speech outputs usually do, with much lower development cost (in labor and time) than it would take to create similarly natural outputs with today's text-to-speech systems. In addition, there may be real efficiencies to be gained in how a user interacts with a spoken language system, as they may be able to rely on information being communicated through the prosodic channel (at the same time as speech), rather than having to have a system's state explicitly spelled out to them via words or other means. This should lead to much greater user willingness to use spoken language systems, increased user satisfaction, and a broader range of tasks that users perceive spoken language systems as performing acceptably.

Paralinguistic effects are a part of everyday human conversation and therefore users should take naturally to them coming from a dialogue system using this design. Users will find dialogue systems with this design easier to use and information can be exchanged more efficiently.

The text-to-speech output may sound much more human and natural than today's text-to-speech outputs usually do. The text-to-speech output should be able to communicate more clearly and/or more efficiently.

FIG. 2 illustrates a block diagram of an example training system for one or more machine learning models trained on paralinguistic effects conveyed with human speech as well as a set of mark-up markers that correlate to each particular paralinguistic effect.

The example training system 200 for the one or more machine learning models can contain the various modules of a speech activity detector, a speech recognition module, one or more machine learning models trained on paralinguistic effects conveyed with human speech as well as a set of mark-up markers that correlate to each particular paralinguistic effect, a user-state analysis module with input from a suite of speech analysis tools, e.g. a user emotional state module, a user sentiment analysis module, a lexical stress module, etc., a representation marker module, a timing module and potentially a natural language generator module and a text-to speech module.

Human conversation utilizing both 1) i) phonemes, ii) words, iii) non-words, and iv) any combination of these, enunciated with paralinguistic effects and as well as 2) normal/standard enunciations the i) phonemes, ii) words, iii) non-words, and iv) any combination of these, are communicated to a speech activity detector. In an embodiment, these human conversations can be communicated through, for example, a microphone. The microphone digitizes the vibrations caused by the sound by taking measurements of the wave frequency. The system can then filter the digitized sound to remove unwanted noise outside of the spoken voice frequency range. The microphone converts the vibrations and frequencies of a user's voice into data (such as a sound wave file). In an embodiment, a memory storing sound wave files can supply the digitized version of the speech into a speech activity detector. In an embodiment, a combination of the memory and the microphone provide digitized versions of the input speech data.

The modules of the speech activity detector, the speech recognition module, the user-state analysis module with input from a suite of speech analysis tools, e.g. the user emotional state module, the user sentiment analysis module, the lexical stress module, etc., and the timing module all function similarly as discussed in FIG. 1.

Note, the speech processing detectors provide low-level speech characteristics and possibly provide suggested explicit paralinguistic effects. For example, a speech processing tool, such as DynaSpeak, has a pitch tracker and can detect lexical stress.

The speech data will be the training data for the machine learning models with a neural network. The input training data has a known label to be associated with the data by the representation marker module. Note, the input training data can be a mixture of labeled training data and unlabeled training data. The AI model(s) goes through a supervised learning training process in which the model and its neural network is required to make predictions and is corrected when those predictions are wrong. The model must learn the paralinguistic effect structures/corresponding prosody changes to organize the data as well as make predictions. The changes in prosody of low-level speech parameters and high-level prosodic patterns of speech, are mapped to each corresponding paralinguistic effect, which is mapped to a corresponding mark-up marker, which is mapped to a corresponding additional information conveyed by the corresponding paralinguistic effect. The training process continues until the model achieves a desired level of accuracy on the training data such as at least 90% accurate.

In an embodiment, a set of speech processing detectors can analyze training data of an audio stream of speech from humans communicating. The set of speech processing detectors detect speech parameters that are indicative of one or more paralinguistic effects on top of enunciated words, phonemes, and non-words in the audio stream. The speech recognition module can receive the training data of the audio stream of speech and create a textual representation for individual words, individual non-words, individual phonemes, and any combinations of these, in the training data of the audio stream of speech. One or more machine learning models that employ neural networks undergo supervised machine learning to train on how to associate one or more mark-up markers with the textual representation for each individual word, individual non-word, and/or individual phoneme that was enunciated with a particular paralinguistic effect. The set of speech processing detectors, the speech recognition module, and the one or more machine learning models can cooperate to automate a labeling of the training data and a pre-deployment training of the machine learning models trained on paralinguistic effects. Each mark-up marker can correspond to its own paralinguistic effect.

The machine learning model(s) can learn how to cooperate with the table to learn how to identify the paralinguistic effects and corresponding markup marker as well as then how to produce the changes in the enunciation of the i) phoneme, ii) word, and/or iii) non-word when conveying a particular paralinguistic effect as well as create and/or update the table of mapping mark-up markers and their corresponding paralinguistic effect on a textual or waveform representation of a word, non-word, and/or a phoneme. The supervised learning for the machine learning uses a linguistic expert to confirm the identified paralinguistic effect suggested by the detection tools in the user-state analysis module. The detection tools themselves can directly detect some paralinguistic effects. However, the detection tools themselves do detect many low-levels aspects of speech—loudness, enunciation length, etc., and these low-levels aspects of speech can be used to identify a presence of paralinguistic effects enunciated on top of the word, non-word, and/or phoneme itself. Additionally, through an additional paralinguistic effect module, the linguistic expert can put in additional paralinguistic effects that the expert detected on individual phonemes, words, and non-words, such as a change in prosody to communicate the user's intent to continue to hold the conversation floor, and/or other paralinguistic effects that are detected by the user and can be flagged by the expert. Many explicit paralinguistic effects correspond to in many cases a combination of lower-level detectors.

Prior to deployment during training, the machine learning models each having its neural network are trained to look for patterns, so the textual and/or waveform representations are analyzed by the set of detectors and when the words, non-words, and/or phonemes differ significantly enough from a norm, (for example differing from the norm enunciation in a reference dialog model by more than 35%), then an output from the set of speech processing detectors conveys both 1) the differing speech parameters, increased or decreased from the norm, in any of, a duration, a volume, and a pitch, as well as 2) a prosodic pattern of change in the differing speech parameters, which are analyzed by the one or more machine learning models and then correlated to a particular paralinguistic effect and then to an intended additional information to be conveyed by that particular paralinguistic effect. (e.g. a rising pitch followed by a pitch plateau), which is analyzed by for one or more machine learning models. The one or more machine learning models can then correlate to an intended additional information conveyed by the paralinguistic effect, such as a stressing an importance of that textual and/or waveform representation, questioning the meaning of that textual and/or waveform representation, surprise, emotions of anger or happiness, boredom, etc., all backed by a supervised machine learning confirming or correcting the results determined by the machine learning models.

In an embodiment, the machine learning models are trained to look for patterns. The set of detectors analyze the training data to assist putting annotations onto the training data so that the machine learning models can correlate 1) a particular paralinguistic effect to at least one of i) an intended additional intended meaning and ii) a more comprehensible of way of conveying information with the particular paralinguistic effect. The machine learning models are trained to learn how to identify each different paralinguistic effect and its corresponding markup marker as well as then how to produce corresponding waveforms when conveying the first paralinguistic effect and the second paralinguistic effect.

Like FIG. 1, a set of speech processing detectors are configured to analyze training data of an audio stream of speech from humans communicating. The set of speech processing detectors detect speech parameters that are indicative of one or more paralinguistic effects on top of enunciated words, phonemes, and non-words in the audio stream. The speech processing detectors can detect low-level speech phenomenon that speakers produce naturally as well as find a locus for the phenomenon. The locus might be a clearly delimited segment, an indefinite segment, or might be something like a pitch peak, which is only one point in time, but which has ramifications for the pitch contour of an indefinite stretch surrounding the peak.

In an embodiment, the machine learning models are trained on changes in prosody including prosodic patterns as well as changes of individual speech parameters to associate and understand the changes on i) individual phonemes, ii) individual words, and iii) individual non-words to particular paralinguistic effects detected by the set of speech processing detectors in the training data of the audio stream of speech. The speech parameters can be increased or decreased from the norm, in any of, a duration, a volume, and a pitch, as well as 2) a prosodic pattern of change in the differing speech parameters.

Again, in parallel to the speech processing detectors identifying low-level speech parameters, the automatic speech recognition module can produce either or both waveform representations of individual words, phonemes, and non-words as well as text representations of the individual words, phonemes, and non-words. The speech recognition module receives the training data of the audio stream of speech and creates 1) a textual representation, 2) a waveform representation, and 3) any combination of both, for individual words, individual non-words, individual phonemes, and any combinations of these, in the training data of the audio stream of speech.

Again, the timing module can sync up the individual waveforms, textual representations, and identified words, non-words, and phonemes with paralinguistic effects from the input speech. These waveform representations of individual words, phonemes, and non-words as well as text representations of the individual words, phonemes, and non-words can be annotated with a paralinguistic effect by a representation marker module.

The representation marker module cooperating with the machine learning model(s) provides a way to represent different paralinguistics meanings onto input text and/or waveforms corresponding to the received digitized data of the input audio stream. After training, this allows a conversational engagement platform to both understand and generate paralinguistic effects to make use of a full range of expressiveness of these words and non-words coming in from and then going out to a human user.

In an embodiment, a representation marker module is configured to annotate the textual representation of the individual words, phonemes, and/or non-words with the first mark-up marker corresponding to the first paralinguistic effect that indicate that particular paralinguistic effect.

The representation marker module will annotate each phoneme, word, and/or non-word, and its detected paralinguistic effects with a corresponding mark-up marker. The mark-up marker can be a high-level discourse-relevant markup. In this way, the paralinguistic effects can be annotated in an audio corpus.

The representation marker module and/or additional paralinguistic effect input module annotates, the training corpus of speech data in an automated manner, with the set of mark-up markers to a corresponding explicit paralinguistic effect. As a simple example, an automatic speech recognition process with a forced alignment of known text can be used to discover a distribution of lengths, loudness, pitch heights, etc. for phonemes or other units, e.g. syllables, and then use the tails of the distribution to provide simple annotations of extreme cases. When the detections are sufficiently accurate and sufficiently numerous, at run time, the machine learning model cooperating with the text to speech module can then reproduce the meaningful characteristics of the acoustic realization that correspond to the desired markup.

The representation marker module and additional paralinguistic effect input module cooperating to identify and annotate the representations with explicit paralinguistic effects themselves.

The representation marker module can use a table of initially prefilled in with some different kinds of mark-up marker (e.g. adding a diacritic symbol of an asterisk ('*) to a phoneme in addition to other types of mark-up marker diacritics, such as an accent or cedilla) which will give the user more control over the prosody, or expressiveness, of the words, phonemes, and/or non-word making up an utterance. For example, the mark-up marker of an asterisk ('*) can communicate to lengthen of an enunciation a word from its standard by adding a mark-up marker of, for example, a colon to communicate to elongate the enunciation of a word, non-word or phoneme.

A portion of the representation marker module can be a script. The script that takes the speech recognition module's output and the detectors' output of low-level speech characteristics and any suggested detected paralinguistic effects from the detectors to decide which phonemes, words, and/or non-words in the training set are, for example long, and then tag the identified phonemes, words, and/or non-words with the corresponding mark-up marker of, for example, a colon CO.

Thus, in an example, words can be emphasized relative to other words, non-words, and phonemes being conveyed by putting lengthening markers after their phonemes. The system uses the example length mark-up marker, ">", after each phoneme in the word wanted to be emphasized. In an example, complex information communicated with words can be better communicated by putting a long-pause marker after their phoneme, and/or by putting a prosody slow down marker to enunciate that phoneme, word, or non-word in slower manner than normal. In another example, a long-pause mark-up marker can be annotated onto a representation. Note, there is a difference in the pause duration between a regular comma in an uttered sentence and the paralinguistic effect of putting a long-pause marker such as ", >" to slow the delivery of complex information so that the user can more easily comprehend the delivery of complex information by the speech generation module.

The cooperation between the set of detectors, the representation marker module, and the machine learning models provide the ability to use the speech recognition and/or other speech processing tools to create paralinguistically important annotations that are too difficult to be feasible without automatic annotation. These are explicit input markings for and control of prosodic and other paralinguistic phenomenon, potentially via a specification of high-level, discourse-relevant events or dialog states. The cooperation between the set of detectors, the representation marker module, and the machine learning model provides an ability to make use of paralinguistic information automatically learned from a training corpus, including learning the variability in these characteristics that occurs in human speech in a given language.

The one or more machine learning models undergo supervised machine learning on their neural network to train on at least how to associate one or more mark-up markers with 1) the textual representation, 2) the waveform representation, and 3) any combination of both, for each individual word, individual non-word, individual phoneme, and any combinations of these, that was enunciated with a particular paralinguistic effect. Each mark-up marker corresponds to its own paralinguistic effect.

The cooperation between the set of detectors, the representation marker module, and the machine learning models provides simple diacritic symbols as mark-up markers that correspond to simple discourse meaning and complex acoustic realization of paralinguistic effects. Note, a diacritic can be a sign, such as an accent or cedilla, which when written above or below or otherwise attached to a phoneme, non-word, or word indicates a difference in pronunciation from the same letter when unmarked or differently marked. The cooperation between the speech recognition module, the set of detectors, the representation marker module, and the machine learning models provides automated annotation of the training data (with the mark-up markers just mentioned).

The set of detectors, the representation marker module, and the machine learning models cooperate to create training data and a mark-up marker annotation set to create a set of prosodic annotations that are usefully communicated through the prosodic channel, which results in sounding (not just robotic with default phoneme lengths and pitch contours, but with human-like expected prosodic lengths/contours, pitch changes, appropriate prosodic patterns which lead to a correct perception by the end user of the conversational engagement platform's communicative intentions). The automated labeling of paralinguistic effects on training data in each domain by the set of detectors, the representation marker module, and the machine learning model cooperating together creates training data and a mark-up marker annotation set that is large enough for prosodic features to be learned very well and thereby generalizable to paralinguistic effects that have not been trained on as well as with very little additional training transferrable to a domain that has not been previously trained on.

Again, the supervised machine learning, via a linguistic expert, can confirm the identified paralinguistic effect suggested by any the detectors in the user-state analysis module. Additionally, the supervised machine learning, via a linguistic expert, can confirm the identified paralinguistic effect annotated by the representation marker module. The linguistic expert's role is confirming things so the supervised machine learning can learn. In addition, through an additional paralinguistic effect input module, the linguistic expert can put in additional paralinguistic effects that the expert detected on individual phonemes, words, and non-words, such as a change in prosody to communicate the user's intent to continue to hold the conversation floor, and/or other paralinguistic effects that are detected by the user and can be flagged by the expert.

The outputs from 1) of the digitized data of the audio stream of speech with its time codes from the speech activity detector, 2) sound waveform representations of individual i) a phoneme, ii) a word, iii) a non-word, and iv) any combination of these, annotated with mark-up markers, and/or 3) textual representations of individual i) a phoneme, ii) a word, iii) a non-word, and iv) any combination of these, annotated with mark-up markers from the representation marker module, 4) and the timeline from the timing module can be supplied to the one or more machine learning models being trained on paralinguistic effects and their corresponding mark-up marker. The use of a machine learning based TIS system will learn the sophisticated acoustic patterns associated with these paralinguistic effects and allow them to be exploited by a conversational engagement platform or even just a training system 200 learning to understand paralinguistic effects in speech.

The many low-level and high-level aspects of speech parameters from the set of speech detectors can be correlated to associated changes in prosody and prosodic patterns and then to each corresponding paralinguistic effect, and mapped to a corresponding mark-up marker. The mapping process from the machine learning models with the feedback loop through a table and the representation marker module takes advantage of the machine learning model's capability with, for example, deep neural networks to implicitly model, learn patterns, and then predict results. The machine learning models can also learn the additional information typically conveyed by a paralinguistic effect on top of the enunciated word, phoneme, and/or non-word itself.

The machine learning models can learn both the prosodic patterns that humans use with each other when communicating a particular paralinguistic effect as well as the mark-up marker corresponding to that particular paralinguistic effect. After repeated supervised learning training, eventually the neural network (e.g. a DNN) learns its paralinguistic effects it is being trained on and then can be adapted to learning additional paralinguistic effects as well as translate that learning to different dialects and spoken languages. The mapping process leverages an ability to automatically detect many low-level (e.g. level details of pitch, loudness, and phoneme length, etc.) and high-level aspects of speech, and the capability of DNNs to implicitly model patterns and then arrive at predictable results/determinations.

The waveform representations, the text representations, the mark-up markers from the representation marker module on what the paralinguistic effect was, and the pattern of prosody causing that paralinguistic effect as well as the timing module's input can all be put into the machine learning module along with a copy of the original input speech from the audio stream. The machine learning module can train on the paralinguistic effects on a per domain basis. For each machine learning model, this system can be initially trained in a narrow, specific domain to be able to understand a normal enunciation and prosody of words, non-words, and phonemes in that domain as well as then mimic the prosodic patterns that humans use with each other in that domain when creating the text-to-speech output from the speech generation module. Note, after being initially trained in a specific domain, the trained model can generalize to other similar domains and tasks that have not been previously trained on as well as additional prosodic patterns and changes that were found in the training data.

Again, the supervised machine learning, via a linguistic expert, can confirm the identified paralinguistic effect suggested by any detection tools in the user-state analysis module. Additionally, the supervised machine learning, via a linguistic expert, can confirm the identified paralinguistic effect annotated by the representation marker module. In addition, through an additional paralinguistic effect input module, the linguistic expert can put in additional paralinguistic effects that the expert detected on individual phonemes, words, and non-words, such as a change in prosody to communicate the user's intent to continue to hold the conversation floor, and/or other paralinguistic effects that are detected by the user and can be flagged by the expert.

Again, a feedback loop can be implemented between the representation marker module and the machine learning models to potentially fine-tune, train, and improve the automated annotation of mark-up markers onto the textual and/or sound wave representations.

When sufficient amounts of training data are used that go through the supervised machine learning, which are made sufficiently accurate and consistent to achieve, for example, a goal of identifying a set of paralinguistic effects at a 95% or better accuracy, then the neural network will learn how to both recognize these effects on the speech input from the humans as well as annotate the representations accurately. Additionally, after the sufficient amounts of training data to identify a set of paralinguistic effects at a 95% or better accuracy (note 95% is an example number and the accuracy could be 91%-99.9%), then the machine learning models can also assist the speech generation module's output to produce these paralinguistic effects phenomenon at runtime. The machine learning models are configured to create a paralinguistic-effect waveform-modification table, which maps each mark-up marker annotated onto text being generated by a natural language generator over to how the speech generation module should modify an enunciation of the i) phoneme, ii) word, and/or iii) non-word with the particular paralinguistic effect via the change in the prosody.

Prior to Runtime, the machine learning models can learn changes to speech parameters corresponding to paralinguistic effects as well as the mark-up markers corresponding to the particular paralinguistic effects. The machine learning models are trained with supervised machine learning on how to identify the paralinguistic effects and corresponding mark-up markers, as well as then understand the additional information being conveyed with each particular paralinguistic effect.

Thus, prior to deployment in the field, the machine learning model(s) is further configured to cooperate with a set of detectors analyzing examples from humans communicating the particular paralinguistic effect to undergo supervised machine learning to train on how to associate (pair) the one or more mark-up markers with the textual representation and/or sound wave representation of the i) phoneme, ii) word, or iii) non-word, in order for the speech generation module communicate the particular paralinguistic effect based on receiving the 1) a textual representation, 2) a sound wave representation, or 3) a combination of both, annotated with mark-up markers.

The machine learning module can also learn, via supervised machine learning, to output waveforms with the paralinguistic effect to be sent to text to speech module as well as using a table of representation mark-up markers and the corresponding paralinguistic effect to annotate a textual representation, waveform representation, or a combination of both generated by a natural language generator.

The machine learning module can update and/or confirm a table of representation mark-up markers and the corresponding paralinguistic effect corresponding to that mark-up marker. As the machine learning model's understanding of the paralinguistic effects and their associated prosodic patterns and change in prosody as well as their communicated additional information, the reference table will be updated. The supervised learning can confirm the update or correct the update.

At runtime, the machine learning module can cooperate directly with the speech generation module to output waveforms with the paralinguistic effect as well as a table of representation mark-up markers and the corresponding paralinguistic effect corresponding to that mark-up marker. The machine learning model(s) can examine and train on the patterns as well as changes of the prosody including volume, duration, pitch, in intonation of a rise and fall to associate and understand changes and prosody on individual phonemes, words, and non-words to paralinguistic effects. The machine learning model(s) analyzing and training on paralinguistic effects with its corresponding mark-up marker, can learn many functions.

As discussed, the machine learning models can also use supervised machine learning on an initial training of how to create waveforms to guide the speech generation module on how to enunciate words, non-words, and/or phonemes, differing from their standard enunciation, with a given paralinguistic effect.

The set of detectors, the representation marker module, and the machine learning model cooperate to lower the cost and time to develop a system with powerful, discourse-appropriate acoustic characteristics.

Network

Figure 3:
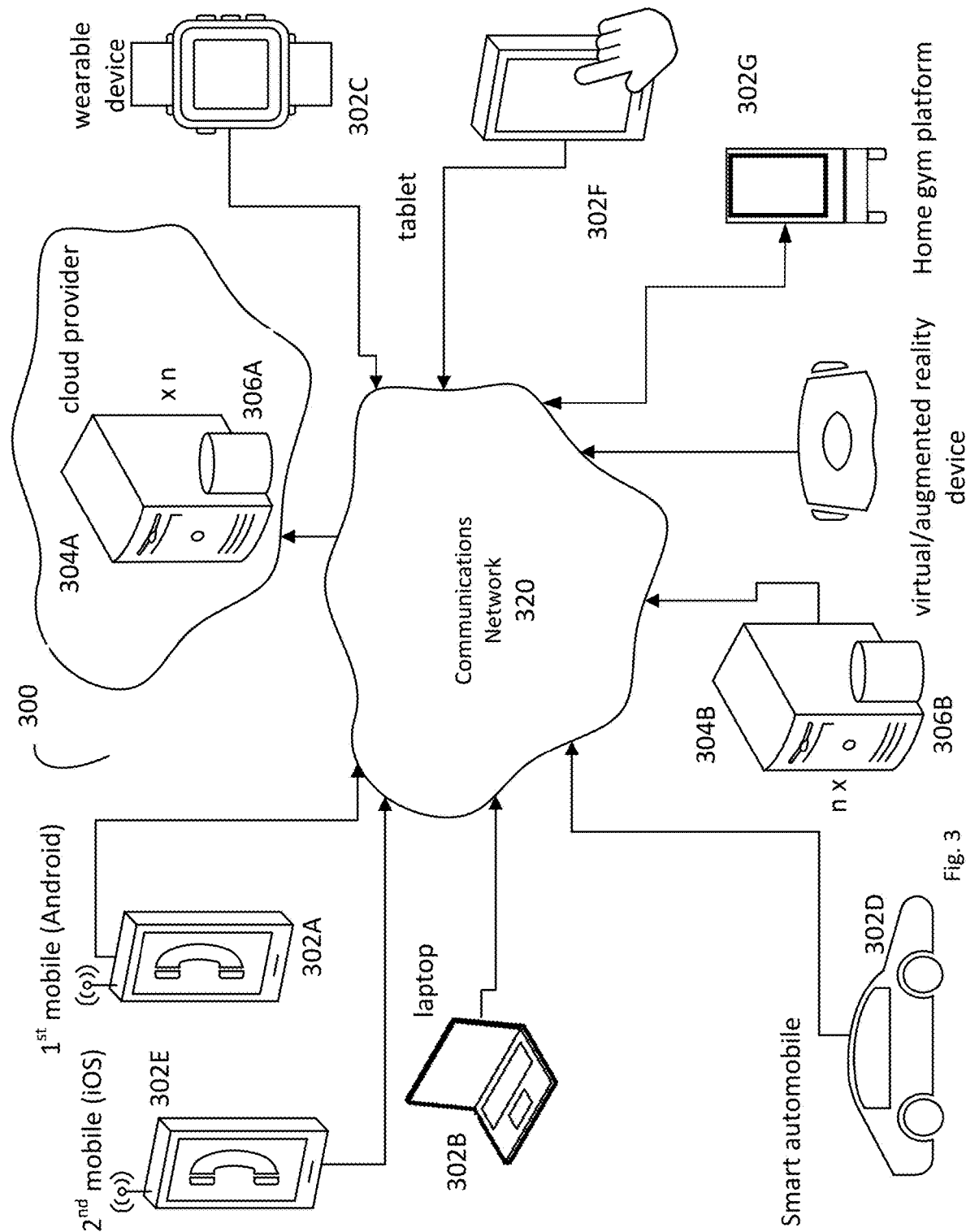
FIG. 3 illustrates a block diagram of a number of electronic systems and devices communicating with each other in a network environment in accordance with an embodiment of the current design.

FIG. 3 illustrates a block diagram of a number of electronic systems and devices communicating with each other in a network environment 300 in accordance with an embodiment of the current design. Components in the conversational engagement platform may communicate in a network environment 300.

The network environment 300 has a communications network 320 that connects server computing systems 304A through 304B, and at least one or more client computing systems 302A to 302G. As shown, there may be many server computing systems 304A through 304B and many client computing systems 302A to 302G connected to each other via the network 320, which may be, for example, the Internet. Note, that alternatively the network 320 might be or include one or more of: an optical network, a cellular network, the Internet, a Local Area Network (LAN), Wide Area Network (WAN), satellite link, fiber network, cable network, or a combination of these and/or others. Each server computing systems 304A-304B can have circuitry and software to communication with the other server computing systems 304A through 304B and the client computing systems 302A to 302G across the network 320. Each server computing systems 304A to 304B can be associated with one or more databases 306A to 306B. Each server 304A to 304B may have one or more instances of a virtual server running on that physical server and multiple virtual instances may be implemented by the design. A firewall may be established between a client computing system, for example, 302D and the network 320 to protect data integrity on the client computing system 302D.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicated use of these resources. The user's cloud-based site is given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

The cloud-based remote access is coded to utilize a protocol, such as Hypertext Transfer Protocol (HTTP), to engage in a request and response cycle with both a mobile device application resident on a client device, 302A-302G, as well as a web-browser application resident on the client device, 302A-302G. In some situations, the cloud-based remote access for a wearable electronic device 302C, can be accessed via a mobile device, a desktop, a tablet device, cooperating with that wearable electronic device 302C. The cloud-based remote access between a client device 302A-302G and the cloud-based provider site 304A is coded to engage in one or more of the following 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud-based remote access to a wearable electronic device, and 5) combinations of these.

In an embodiment, the server computing system 304A may include a server engine, a web page management component or online service or online app component, a content management component, and a database management component. The server engine performs basic processing and operating system level tasks. The web page management component, online service, or online app component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

Computing Devices

Figure 4:
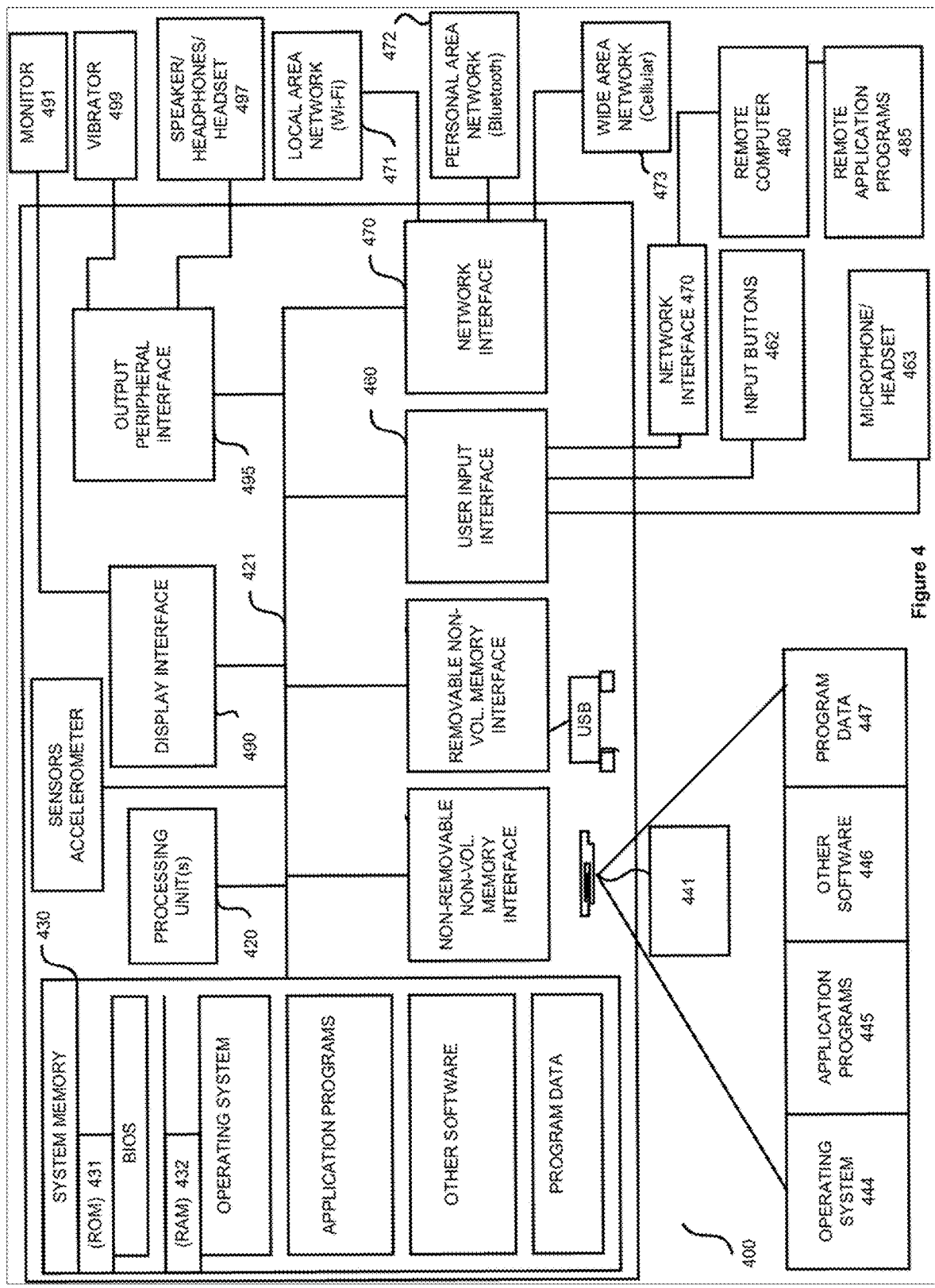
FIG. 4 illustrates a block diagram of an embodiment of one or more computing devices that can be a part of the conversational assistant for an embodiment of the current design discussed herein.

FIG. 4 illustrates a block diagram of an embodiment of one or more computing devices that can be a part of the conversational engagement platform for an embodiment of the current design discussed herein. Components in the conversational engagement platform can implement aspects of the computing device as follows. For example, a detector in the set of detectors can have an architecture like this.

The computing device may include one or more processors or processing units 420 to execute instructions, one or more memories 430-432 to store information, one or more data input components 460-463 to receive data input from a user of the computing device 400, one or more modules that include the management module, a network interface communication circuit 470 to establish a communication link to communicate with other computing devices external to the computing device, one or more sensors where an output from the sensors is used for sensing a specific triggering condition and then correspondingly generating one or more preprogrammed actions, a display screen 491 to display at least some of the information stored in the one or more memories 430-432 and other components. Note, portions of this design implemented in software 444, 445, 446 can be stored in the one or more memories 430-432 and are executed by the one or more processors 420. The processing unit 420 may have one or more processing cores, which couples to a system bus 421 that couples various system components including the system memory 430. The system bus 421 may be any of several types of bus structures selected from a memory bus, an interconnect fabric, a peripheral bus, and a local bus using any of a variety of bus architectures.

Computing device 402 typically includes a variety of computing machine-readable media. Machine-readable media can be any available media that can be accessed by computing device 402 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 402. Transitory media such as wireless channels are not included in the machine-readable media. Machine-readable media typically embody computer readable instructions, data structures, and other executable software.

In an example, a volatile memory drive 441 is illustrated for storing portions of the operating system 444, application programs 445, other executable software 446, and program data 447.

A user may enter commands and information into the computing device 402 through input devices such as a keyboard, touchscreen, or software or hardware input buttons 462, a microphone 463, a pointing device and/or scrolling input component, such as a mouse, trackball or touch pad 461. The microphone 463 can cooperate with speech recognition software. These and other input devices are often connected to the processing unit 420 through a user input interface 460 that is coupled to the system bus 421, but can be connected by other interface and bus structures, such as a lighting port, game port, or a universal serial bus (USB). A display monitor 491 or other type of display screen device is also connected to the system bus 421 via an interface, such as a display interface 490. In addition to the monitor 491, computing devices may also include other peripheral output devices such as speakers 497, a vibration device 499, and other output devices, which may be connected through an output peripheral interface 495.

The computing device 402 can operate in a networked environment using logical connections to one or more remote computers/client devices, such as a remote computing system 480. The remote computing system 480 can a personal computer, a mobile computing device, a server, a router, a network PC, a peer device or other common network node, and typically includes many or all of the elements described above relative to the computing device 402. The logical connections can include a personal area network (PAN) 472 (e.g., Bluetooth®), a local area network (LAN) 471 (e.g., Wi-Fi), and a wide area network (WAN) 473 (e.g., cellular network). Such networking environments are commonplace in offices, enterprise-wide computer networks, intranets and the Internet. A browser application and/or one or more local apps may be resident on the computing device and stored in the memory.

When used in a LAN networking environment, the computing device 402 is connected to the LAN 471 through a network interface 470, which can be, for example, a Bluetooth® or Wi-Fi adapter. When used in a WAN networking environment (e.g., Internet), the computing device 402 typically includes some means for establishing communications over the WAN 473. With respect to mobile telecommunication technologies, for example, a radio interface, which can be internal or external, can be connected to the system bus 421 via the network interface 470, or other appropriate mechanism. In a networked environment, other software depicted relative to the computing device 402, or portions thereof, may be stored in the remote memory storage device. By way of example, and not limitation, remote application programs 485 as reside on remote computing device 480. It will be appreciated that the network connections shown are examples and other means of establishing a communications link between the computing devices that may be used.

It should be noted that the present design can be carried out on a computing device such as that described with respect to this Figure. However, the present design can be carried out on a server, a computing device devoted to message handling, or on a distributed system in which different portions of the present design are carried out on different parts of the distributed computing system.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, HTTP, Java, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both.

Generally, an application includes programs, routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus, comprising:
one or more machine learning models trained to examine audio data that includes at least one of i) a word, ii) a phoneme, and iii) a non-word, in a speech communication, that is annotated with one or more mark-up markers and guide a generation of a textual representation to cause a different enunciation from a plain enunciation that would occur without the one or more mark-up markers in order to convey an additional intended meaning of an enunciated i) word, ii) phoneme, and/or iii) non-word, themselves conveyed by a pairing of the i) word, ii) phoneme, or iii) non-word with the different enunciation, where the one or more machine learning models were trained with training data of humans speaking with paralinguistic effects,
where a speech generation module is configured to receive the textual representation generated to guide the speech generation module so that the speech generation module is configured to create speech of the i) word, ii) phoneme, or iii) non-word in the different enunciation with a particular paralinguistic effect in a manner that better conveys the additional intended meaning of the enunciated i) word, ii) phoneme, and/or iii) non-word, themselves; and
where any software portions of the speech generation module and the one or more machine learning models are stored in one or more non-transitory storage mediums in an executable state by one or more processors.

2. The apparatus of claim 1, further comprising:
a table is configured to map a set of mark-up markers, where each different mark-up marker is mapped to its corresponding particular paralinguistic effect on the enunciated i) word, ii) phoneme, and/or iii) non-word; and
where the one or more machine learning models are configured to cooperate with the table to produce the particular paralinguistic effect changes in the enunciation of the enunciated i) word, ii) phoneme, and/or iii) non-word when conveying the particular paralinguistic effect.

3. The apparatus of claim 1, further comprising:
a natural language generator module is configured to generate the textual representation of the i) word, ii) phoneme, and/or iii) non-word;
a table of mark-up markers, where each mark-up marker corresponds its own paralinguistic effect; and
where the table is referenced by the natural language generator module to mark-up the textual representation of the i) word, ii) phoneme, or iii) non-word, with the one or more mark-up markers to guide the speech generation module on how to enunciate the i) word, ii)

phoneme, or iii) non-word, with the particular paralinguistic effect to cause the different enunciation from the plain enunciation of that i) word, ii) phoneme, or iii) non-word.

4. The apparatus of claim 3, where the different enunciation differs in one or more speech parameters from the plain enunciation of that i) word, ii) phoneme, or iii) non-word by a threshold amount.

5. The apparatus of claim 1, where the one or more machine learning models are trained with supervised machine learning on how to identify the particular paralinguistic effects and corresponding mark-up markers, as well as then to understand the additional-intended meaning being conveyed with each particular paralinguistic effect.

6. An apparatus, comprising:
a set of speech processing detectors are configured to analyze training data of an audio stream of speech from humans communicating, where the set of speech processing detectors detect speech parameters that are indicative of one or more paralinguistic effects on top of enunciated words, phonemes, and non-words in the audio stream;
a speech recognition module is configured to receive the training data of the audio stream of speech and create a textual representation for i) individual words, ii) individual non-words, iii) individual phonemes, and any combinations of these, in the training data of the audio stream of speech;
one or more machine learning models that employ neural networks are configured to undergo supervised machine learning to train on how to associate one or more mark-up markers with the textual representation for each i) individual word, ii) individual non-word, and/or iii) individual phoneme that was enunciated with a particular paralinguistic effect; and
where the set of speech processing detectors, the speech recognition module, and the one or more machine learning models are configured to cooperate to automate a labeling of the training data and a pre-deployment training of the one or more machine learning models trained on the one or more paralinguistic effects, where a first mark-up marker corresponds to a first paralinguistic effect and a second mark-up marker corresponds to a second paralinguistic effect, where the first mark-up marker with the first paralinguistic effect is configured to change a meaning conveyed by the i) individual word, ii) individual non-word, and/or iii) individual phoneme that was enunciated with the first paralinguistic effect compared to an enunciation of the i) individual word, ii) individual non-word, and/or iii) individual phoneme with the second paralinguistic effect.

7. The apparatus of claim 6, where the one or more machine learning models are trained on changes in prosody including prosodic patterns as well as changes of individual speech parameters to associate and understand the changes on the i) individual words, ii) individual non-words, and/or iii) individual phonemes to particular paralinguistic effects detected by the set of speech processing detectors in the training data of the audio stream of speech.

8. The apparatus of claim 6, further comprising:
where the one or more machine learning models are trained to look for patterns, and
where the set of speech processing detectors are configured to analyze the training data to assist putting annotations onto the training data so that the one or more machine learning models can correlate, at least 1) a first particular paralinguistic effect to at least one of i) an intended additional intended meaning and ii) a more comprehensible of way of conveying information with the first particular paralinguistic effect.

9. The apparatus of claim 6, where the one or more machine learning models are trained to learn how to identify each different paralinguistic effect and its corresponding markup marker as well as then how to produce corresponding waveforms when conveying the first paralinguistic effect and the second paralinguistic effect.

10. The apparatus of claim 6, further comprising:
a representation marker module is configured to annotate the textual representation of the i) individual words, ii) individual non-words, and/or iii) individual phonemes with the first mark-up marker corresponding to the first paralinguistic effect that indicate that particular paralinguistic effect.

11. A method for a conversational engagement platform, comprising:
configuring one or more machine learning models trained to examine audio data that includes at least one of i) a word, ii) a phoneme, and iii) a non-word, in a speech communication, that is annotated with one or more mark-up markers to guide a generation of a textual representation to cause a different enunciation from a plain enunciation that would occur without the one or more mark-up markers in order to convey an additional intended meaning of an enunciated i) word, ii) phoneme, and/or iii) non-word, themselves conveyed by a pairing of the i) word, ii) phoneme, or iii) non-word with the different enunciation compared to the plain enunciation, where the one or more machine learning models were trained with training data of humans speaking with paralinguistic effects,
configuring a speech generation module to receive the textual representation generated to guide the speech generation module to generate speech in the different enunciation of the i) word, ii) phoneme, or iii) non-word with a particular paralinguistic effect in a manner that better conveys the additional intended meaning of the enunciated i) word, ii) phoneme, and/or iii) non-word, themselves conveyed by a pairing of the i) word, ii) phoneme, or iii) non-word with the different enunciation; and
where any software portions of the speech generation module and the one or more machine learning models are stored in one or more non-transitory storage mediums in an executable state by one or more processors.

12. The method for the conversational engagement platform of claim 11, further comprising:
configuring a table to map a set of mark-up markers, where each different mark-up marker is mapped to its corresponding particular paralinguistic effect on the enunciated i) word, ii) phoneme, and/or iii) non-word; and
configuring the one or more machine learning models to cooperate with the table to produce the particular paralinguistic effect changes in the enunciation of the enunciated i) word, ii) phoneme, and/or iii) non-word when conveying the particular paralinguistic effect.

13. The method for the conversational engagement platform of claim 11, further comprising:
configuring a natural language generator module to generate the textual representation of the i) word, ii) phoneme, and/or iii) non-word;

configuring a table of mark-up markers, where each mark-up marker corresponds its own paralinguistic effect; and configuring the table to be referenced by the natural language generator module to mark-up the textual representation of the i) word, ii) phoneme, or iii) non-word, with the one or more mark-up markers to guide the speech generation module on how to enunciate the i) word, ii) phoneme, or iii) non-word with the particular paralinguistic effect to cause the different enunciation from the plain enunciation of that i) word, ii) phoneme, or iii) non-word.

14. The method for the conversational engagement platform of claim 13, where the different enunciation differs in one or more speech parameters from the plain enunciation of that i) word, ii) phoneme, or iii) non-word by a threshold amount.

15. The method for the conversational engagement platform of claim 11, where the one or more machine learning models are trained with supervised machine learning on how to identify the particular paralinguistic effects and corresponding mark-up markers, as well as then to understand the additional intended meaning being conveyed with each particular paralinguistic effect.

16. A method for a conversational engagement platform, comprising:

configuring a set of speech processing detectors to analyze training data of an audio stream of speech from humans communicating, where the set of speech processing detectors detect speech parameters that are indicative of one or more paralinguistic effects on top of enunciated words, phonemes, and non-words in the audio stream;

configuring a speech recognition module to receive the training data of the audio stream of speech and create a textual representation for i) individual words, ii) individual non-words, and/or iii) individual phonemes, and any combinations of these, in the training data of the audio stream of speech;

training one or more machine learning models that employ neural networks with supervised machine learning to train on how to associate one or more mark-up markers with the textual representation for each i) individual word, ii) individual non-word, and/or iii) individual phoneme that was enunciated with a particular paralinguistic effect;

configuring the set of speech processing detectors, where the speech recognition module, and the one or more machine learning models cooperate to automate a labeling of the training data and a pre-deployment training of the one or more machine learning models trained on the one or more paralinguistic effects, where a first mark-up marker corresponds to a first paralinguistic effect and a second mark-up marker corresponds to a second paralinguistic effect; and configuring the first mark-up marker with the first paralinguistic effect to change a meaning conveyed by the i) individual word, ii) individual non-word, and/or iii) individual phoneme that was enunciated with the first paralinguistic effect compared to an enunciation of the i) individual word, ii) individual non-word, and/or iii) individual phoneme with the second paralinguistic effect.

17. The method for the conversational engagement platform of claim 16, where the one or more machine learning models are trained on changes in prosody including prosodic patterns as well as changes of individual speech parameters to associate and understand the changes on the i) individual words, ii) individual non-words, and iii) individual phonemes to particular paralinguistic effects detected by the set of speech processing detectors in the training data of the audio stream of speech.

18. The method for the conversational engagement platform of claim 16, further comprising:

configuring the one or more machine learning models trained to look for patterns, and analyzing the training data by with the set of speech processing detectors to put annotations onto the training data so that the one or more machine learning models can correlate, at least 1) a first particular paralinguistic effect to at least one of i) an intended additional intended meaning and ii) a more comprehensible of way of conveying information with the first particular paralinguistic effect.

19. The method of claim 16, further comprising:

configuring the one or more machine learning models to train on how to learn to identify each different paralinguistic effect and its corresponding markup marker as well as then how to produce corresponding waveforms when conveying the first paralinguistic effect and the second paralinguistic effect.

20. The method of claim 16, further comprising:

configuring a representation marker module to annotate the textual representation of the i) individual words, ii) individual non-words, and/or iii) individual phonemes with the first mark-up marker corresponding to the first paralinguistic effect that indicate that particular paralinguistic effect.

* * * * *